United States Patent [19]
Condon et al.

[11] Patent Number: 5,653,254
[45] Date of Patent: Aug. 5, 1997

[54] HOUSING FOR ANGLE STOP VALVE FOR CONNECTION TO HOT AND COLD WATER SUPPLY LINE AND SINK FAUCETS

[76] Inventors: Duane R. Condon, 2330 Raymond Ave., Ramona, Calif. 92065; Richard G. Davis, 9610 Green Spruce Rd., Lakeland, Tenn. 38002

[21] Appl. No.: 647,032

[22] Filed: May 9, 1996

Related U.S. Application Data

[63] Continuation of Ser. No. 432,592, May 1, 1995, Pat. No. 5,558,119, which is a continuation of Ser. No. 252,406, Jun. 1, 1994, Pat. No. 5,423,345.

[51] Int. Cl.⁶ .................................................... F16L 5/00
[52] U.S. Cl. ........................... 137/360; 312/229; 312/242
[58] Field of Search ............................ 137/360; 312/229, 312/242

[56] References Cited

U.S. PATENT DOCUMENTS 4,564,249  1/1986  Logsdon .................... 312/229
4,716,925  1/1988  Pratler ...................... 137/360

*Primary Examiner*—A. Michael Chambers
*Attorney, Agent, or Firm*—Baker, Maxham, Jester & Meador

[57] ABSTRACT

An angle stop box includes a generally rectangular housing having a bottom wall and a pair of sidewalls connected to the bottom wall. The bottom wall has a pair of holes extending therethrough. A pair of angle stop valves have their male shanks mounted in corresponding holes in the bottom wall of the housing. A drain fitting receptacle is formed in an upper part of the housing for coupling to a downstream end of a P-trap on a forward side of the drain fitting receptacle and for coupling to drain and vent pipes on a rear side of the drain fitting receptacle. The drain fitting receptacle includes a cylindrical sleeve for receiving a forward end of a pipe fitting, such as a ninety-degree elbow or a T-shaped fitting. The housing has a flange that extends around an entire periphery thereof for facilitating the attachment of the box to one or more studs by nailing therethrough.

7 Claims, 6 Drawing Sheets

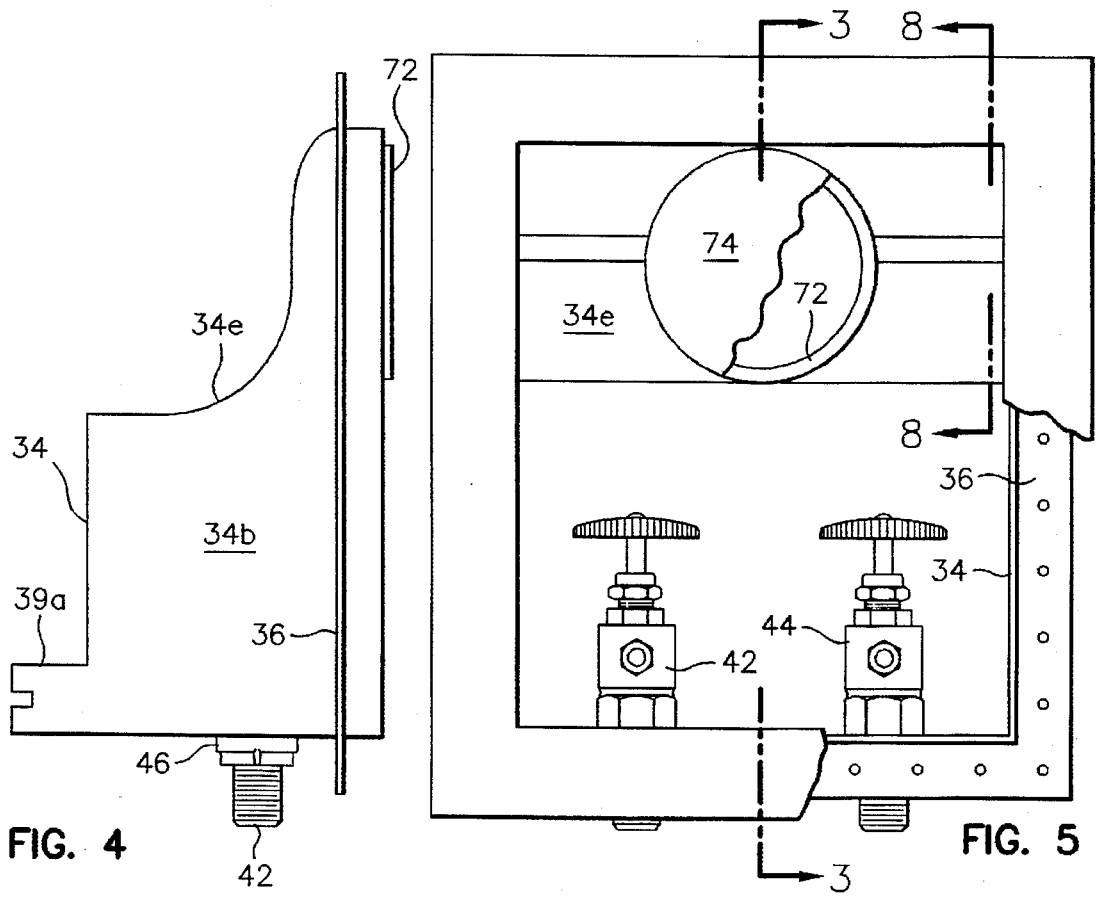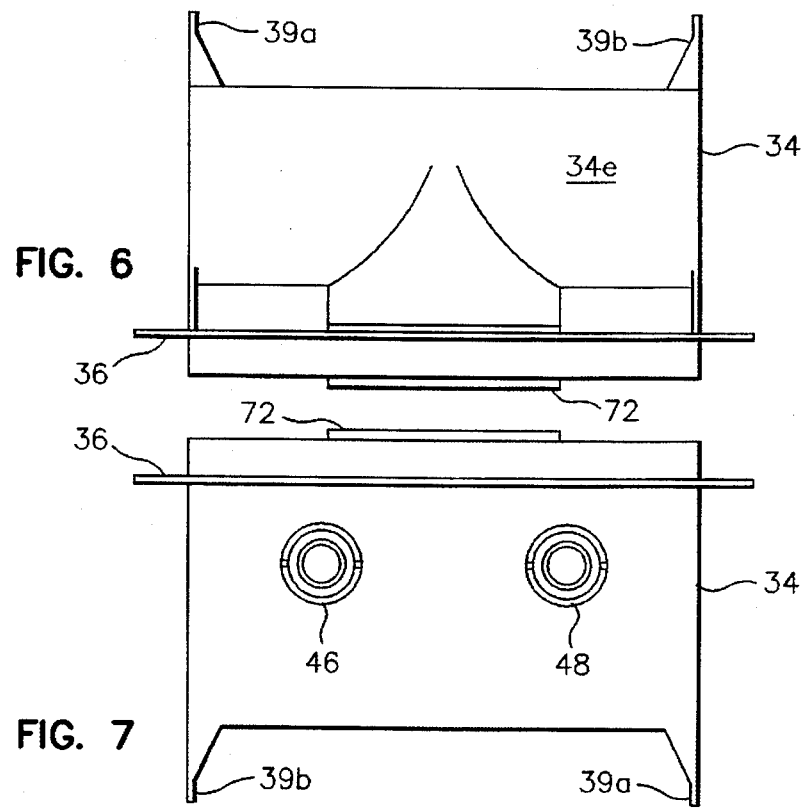

HOUSING FOR ANGLE STOP VALVE FOR CONNECTION TO HOT AND COLD WATER SUPPLY LINE AND SINK FAUCETS

BACKGROUND OF THE INVENTION

CROSS-REFERENCE TO RELATED APPLICATIONS

This application is a continuation of U.S. patent application Ser. No. 08/432,592, filed May 1, 1995, now U.S. Pat. No. 5,558,119 granted Sep. 24, 1996, which in turn is a continuation of U.S. patent application Ser. No. 08/252,406, filed Jun. 1, 1994, now U.S. Pat. No. 5,423,345.

The present invention relates to plumbing installations, and more particularly, to the installation of a wall mounted box for enclosing one or more angle stop valves and a drain fitting receptacle for connecting a P-trap to a trap arm.

Local governing bodies typically mandate building codes, such as the Uniform Plumbing Code (UPC), that incorporate very specific regulations regarding plumbing installations. Such regulations set forth in detail the manner in which sinks must be connected to water supply lines, drain pipes and vent pipes.

FIG. 1 illustrates a typical prior art plumbing installation in a bathroom before drywall has been nailed over the studs and a sink and its supporting cabinet are installed. Hot and cold water supply lines 10 and 12 extend vertically between studs 14 and 16 and then horizontally to form hot and cold stub-outs 18 and 20. The water supply lines and stub-outs are typically made of Copper or polybutylene. The stub-outs are supported by a metal strap 22 nailed to the studs 14 and 16. An ABS drain pipe 24 also extends vertically between the studs 14 and 16 and is connected to the lower coupling of an ABS T-shaped fitting 26. The drain pipe 24 extends to the main sewer line in the house. An ABS vent pipe 28 is connected to the upper coupling of the T-shaped fitting 26 and extends through the roof. An ABS trap arm 30 is connected to the center coupling of the T-shaped fitting 26 and extends horizontally away from the studs 14 and 16. The plumber must estimate where the sink will be installed and locate the stub-outs 18 and 20 and the trap arm 30 accordingly.

The drywall (not shown) has holes cut in the same so that the stub-outs 18 and 20 and trap arm 30 can be inserted therethrough before the drywall is nailed to the studs. The local building inspector typically requires pressure testing of the water lines and drain/waste/vent system before approval is given. Therefore the stub-outs 18 and 20 are typically sealed at their outer ends (not illustrated) and a mechanical test plug (not illustrated) is inserted into the upstream end of the trap arm 30. This must be done throughout the house at each similar plumbing installation. If a leak is found in the water supply system, the water supply lines must be drained if they are Copper to permit resoldering of the leaking joint. This requires the seals on the stub-outs 18 and 20 to be removed and then re-installed for a second pressure test. Test plugs used with the trap arm 30 are usually either an inflatable pneumatic ball, an internally installed "dollar plug" or an externally installed "JIM" cap. All three of these mechanical plugging devices are tedious to install and remove.

Once the water supply and DWV systems have passed inspection, a P-trap (not illustrated in FIG. 1) is connected to the upstream end of the trap arm 30 and connected to the bottom of the sink. The seals on the ends of the stub-outs 18 and 20 are removed and angle stop valves (not illustrated) are connected. The installation of angle stop valves after drywall and cabinets have been installed is very problematic. Water drains even if the pressure has been turned off. The water is dirty with flux and other residue which stains the cabinets. After clean-up, Copper, polybutylene or braided steel water lavatory supply lines (not illustrated) are connected between the angle stop valves and the sink faucets.

The conventional plumbing installation illustrated in FIG. 1 can lead to problems when the builder decides to relocate the sink and/or its supporting cabinet to one side of the drywall covered stub-outs and trap arm. The vertical sidewalls of the cabinet or its drawers may obstruct proper connection of the P-trap and the hot and cold water supply lines.

SUMMARY OF THE INVENTION

It is therefore the primary object of the present invention to provide a wall mounted box for enclosing one or more angle stop valves for connecting hot and cold water supply lines to faucets of a sink and having a drain fitting receptacle for connecting a P-trap to a drain system.

It is another object of the present invention to eliminate the need for installing mechanical plugs to seal the drains at each lavatory installation in pressure testing the drain system of a residence or commercial building.

It is another object of the present invention to eliminate the need to unseal hot and cold water stub-outs in order to drain a Copper water pipe system in a residence or commercial building to facilitate re-soldering of leaking joints.

It is another object of the present invention to provide a angle stop box that can be attached to studs and recessed behind dry wall for rapid connection of water supply lines and a drain pipe to a bathroom or kitchen lavatory.

According to the present invention, an angle stop box includes a generally rectangular housing having a bottom wall and a pair of sidewalls connected to the bottom wall. The bottom wall has a pair of holes extending therethrough. A pair of angle stop valves have their male shanks mounted in corresponding holes in the bottom wall of the housing. A drain fitting receptacle is formed in an upper part of the housing for coupling to a downstream end of a P-trap on an upstream side of the drain fitting receptacle and for coupling to drain and vent pipes on a rear side of the drain fitting receptacle. The drain fitting receptacle includes a cylindrical sleeve for receiving an upstream end of a pipe fitting, such as a ninety-degree elbow or a T-shaped fitting. The housing has a flange that extends around an entire periphery thereof for facilitating the attachment of the box to one or more studs by nailing therethrough.

BRIEF DESCRIPTION OF THE DRAWINGS

FIG. 4 is a side elevation view of the preferred embodiment.

FIG. 5 is a front elevation view of the preferred embodiment with portions broken away to show further details.

FIG. 6 is a top plan view of the preferred embodiment.

FIG. 7 is a bottom plan view of the preferred embodiment.

DESCRIPTION OF THE PREFERRED EMBODIMENT

Figure 2:
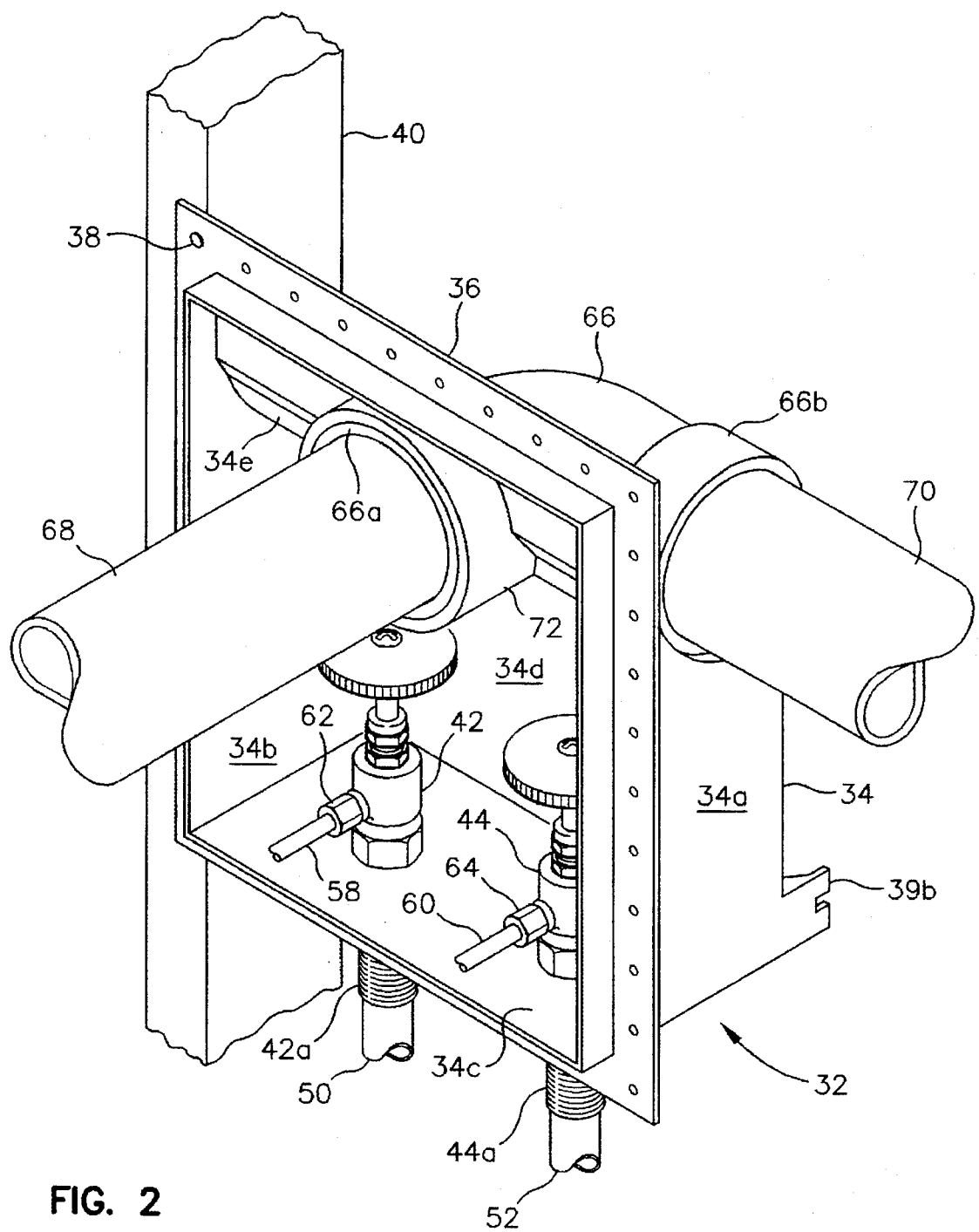
FIG. 2 is a fragmentary perspective view illustrating the installation of a preferred embodiment of our angle stop box secured to a single vertical wall stud. The hot and cold water supply lines are connected to the angle stop box from below. This figure also shows a ninety-degree DWV elbow fitting supported by the angle stop box that forms part of a trap arm that connects to the drain and vent pipes.

Referring to FIG. 2, the preferred embodiment of our invention is generally designated with the reference numeral 32. It includes a generally rectangular housing or box 34 preferably molded of suitable UPC approved plastic. The box 34 has a pair of vertical sidewalls 34a and 34b which are joined by a horizontal bottom wall 34c. The box 34 defines a hollow interior that has a vertical rear wall 34d so that the box opens forwardly. A peripheral flange 36 extends outwardly around the entire outer edge of the box 34 and has regularly spaced holes for receiving nails such as 38 for securing the box to a vertical stud 40.

The flange 36 (FIG. 2) is preferably molded as an integral part of the box 34. It extends around the entire periphery of the box in order to enable it to be connected to studs on different sides of the box or adjacent the top or bottom of the box. The flange 36 helps impart rigidity to the box to ensure that it maintains its true rectangular configuration during installation. This facilitates insertion of an escutcheon described hereafter.

Figure 3:
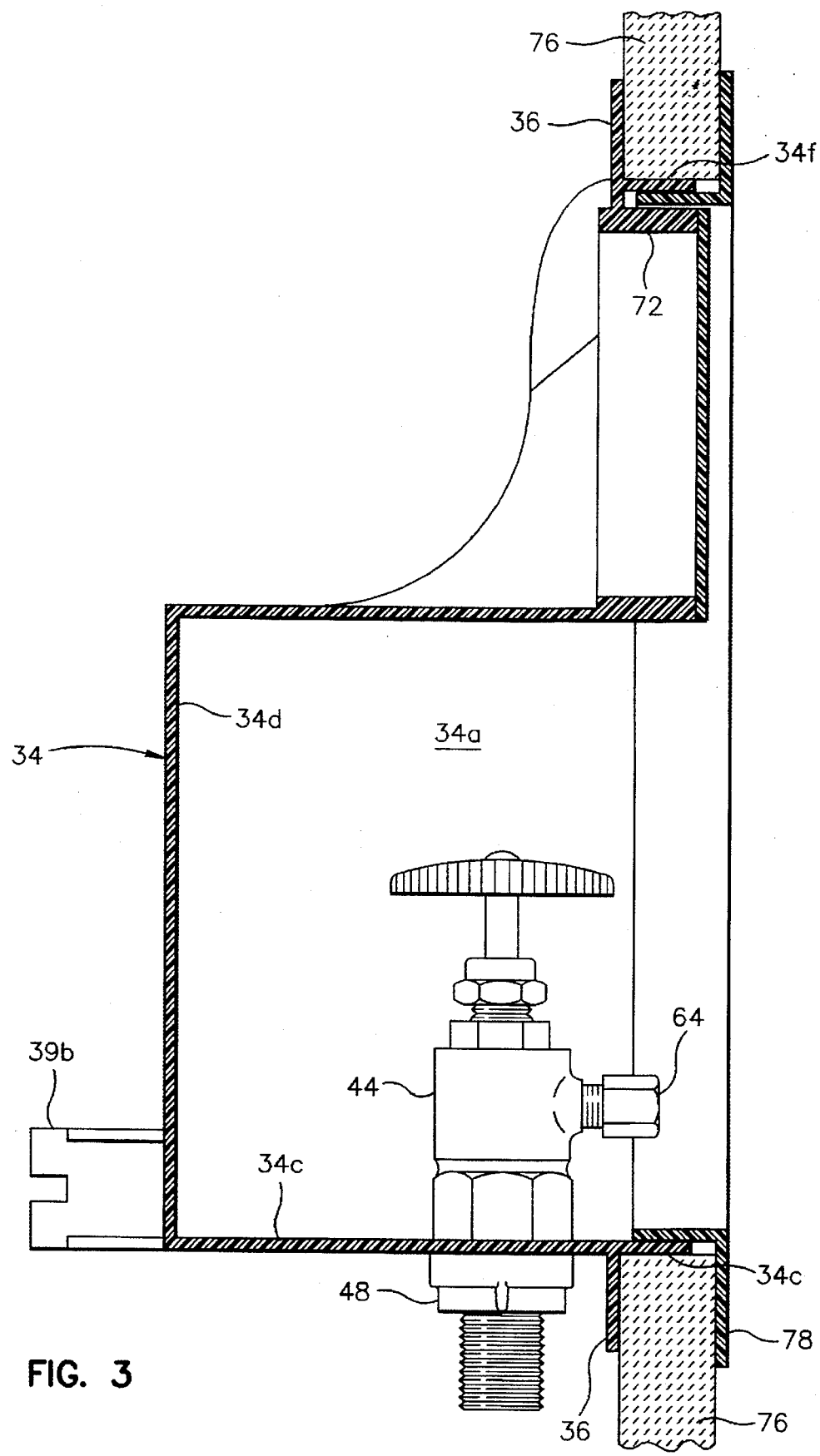
FIG. 3 is an enlarged vertical sectional view of the preferred embodiment taken along line 3—3 of FIG. 5.
Figure 9:
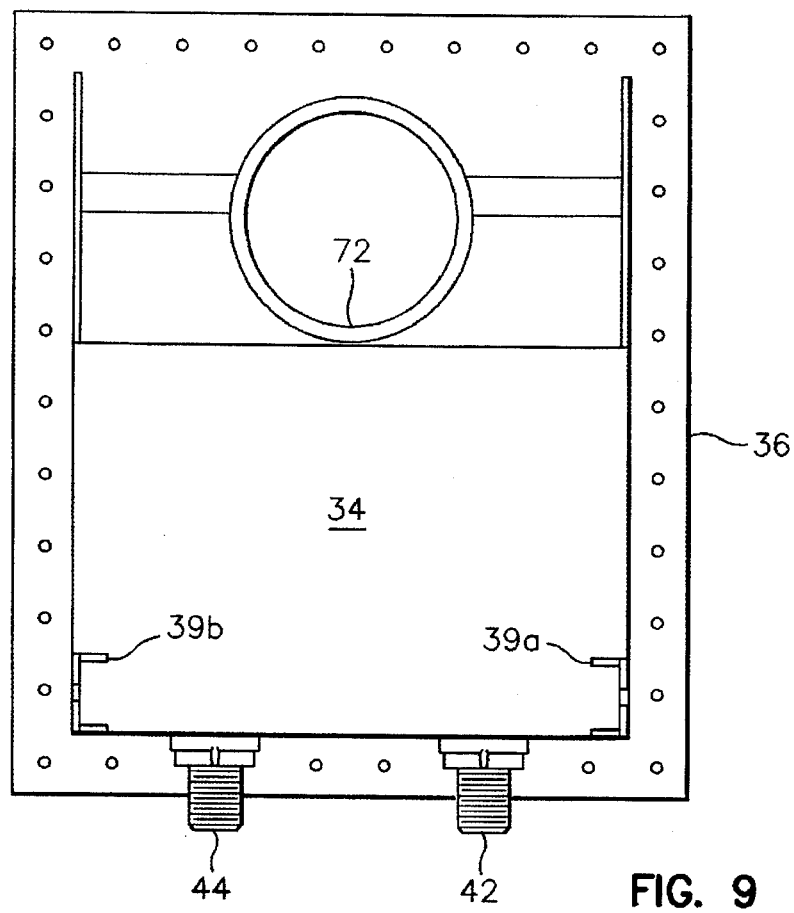
FIG. 9 is a rear elevation view of the preferred embodiment of our angle stop box.

Mounting straps 39a and 39b (FIGS. 3, 6 and 9) extend rearwardly from the lower portions of the sidewalls 34a and 34b, respectively. They have slots in their rearward ends for receiving nails which may also be driven into an adjacent stud to provide additional mounting rigidity through triangulation.

A pair of standard Brass angle stop valves 42 and 44 (FIG. 2) have male threaded shanks 42a and 44a which extend through corresponding holes in the bottom wall 34c of the box. Nuts 46 and 48 (FIGS. 3 and 7) are screwed over the threaded shanks of the valves 42 and 44, respectively and are tightened against the bottom wall 34c to hold the valves securely in position. Copper hot and cold water supply lines 50 and 52 (FIG. 2) are inserted inside the hollow threaded shanks of the angle stop valves 42 and 44, respectively, and soldered thereto in conventional fashion. CPVC or other hot and cold water supply lines could be connected to angle stop valves having modified shanks adapted for compression type connections. Copper, polybutylene or braided lavatory supply lines 58 and 60 are then connected between the angle stop valves 42 and 44, respectively, and the faucets (not shown) using standard compression nuts 62 and 64. The water system can thus be pressurized for the building inspector. If any leaks are detected, the water system can be readily drained through the angle stop valves 42 and 44 to facilitate the repair of any leaks.

A ninety-degree DWV pipe elbow fitting 66 (FIG. 2) is supported by the angle stop box 32 for connecting a DWV arm 68 and a DWV drain extension 70 through the angle stop box. Collectively the fitting 66, arm 68 and extension 70 form a trap arm that connects the P-trap (not shown) to the drain and vent pipes. A cylindrical sleeve 72 (FIG. 3) is provided in the upper portion of the box 34 for receiving one end of the elbow fitting 66. The cylindrical sleeve 72 is positioned so that the arm 68 extends substantially perpendicular to the plane of the surrounding drywall 76. The internal diameter of the sleeve 72 is dimensioned so that the forward end shoulder 66a (FIG. 2) of the standard elbow fitting 66 fits snugly therein.

Figure 1:
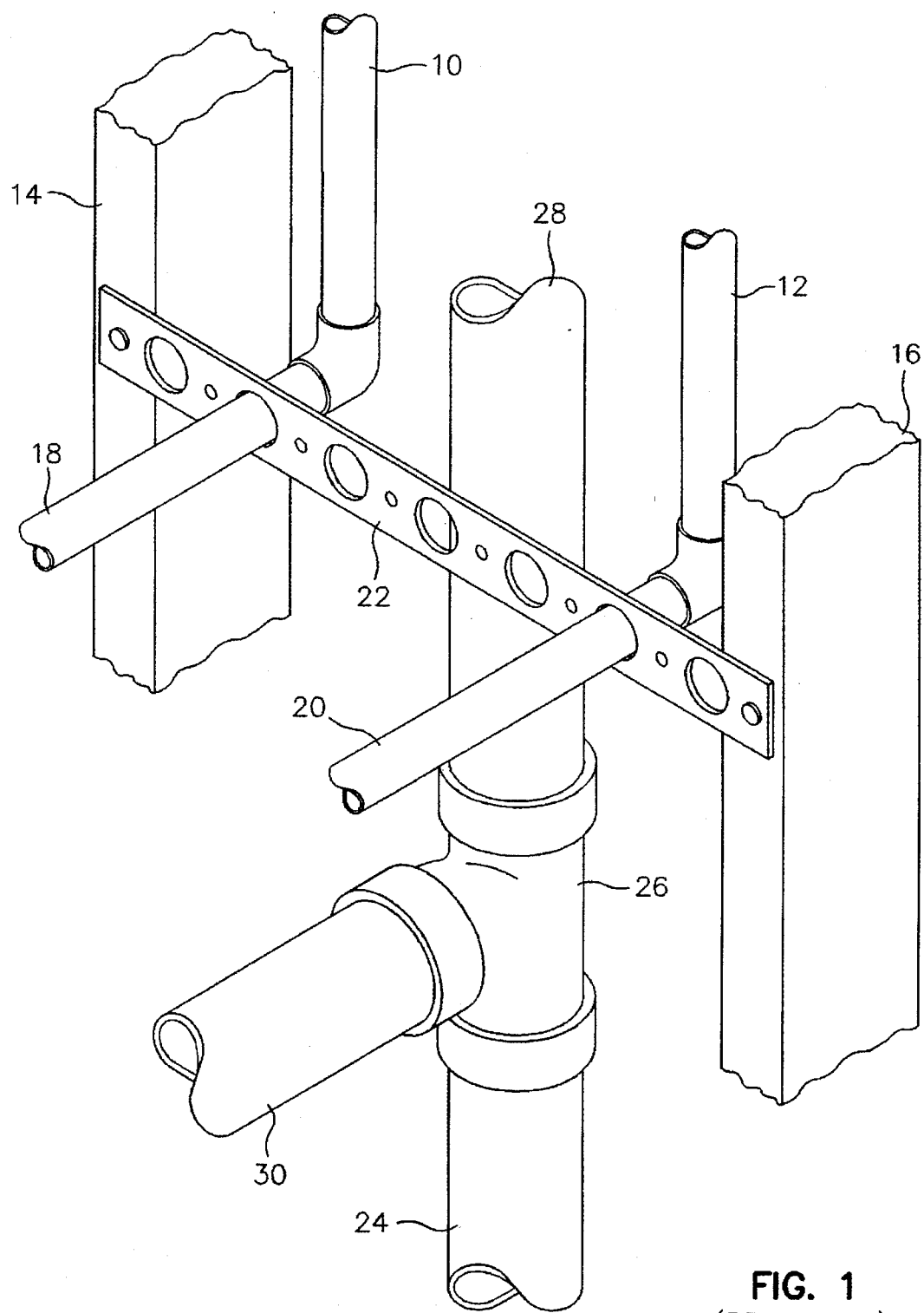
FIG. 1 is a fragmentary perspective view of a typical prior art plumbing installation in a bathroom before drywall has been nailed over the studs and a sink and its supporting cabinet are installed.
Figure 8:
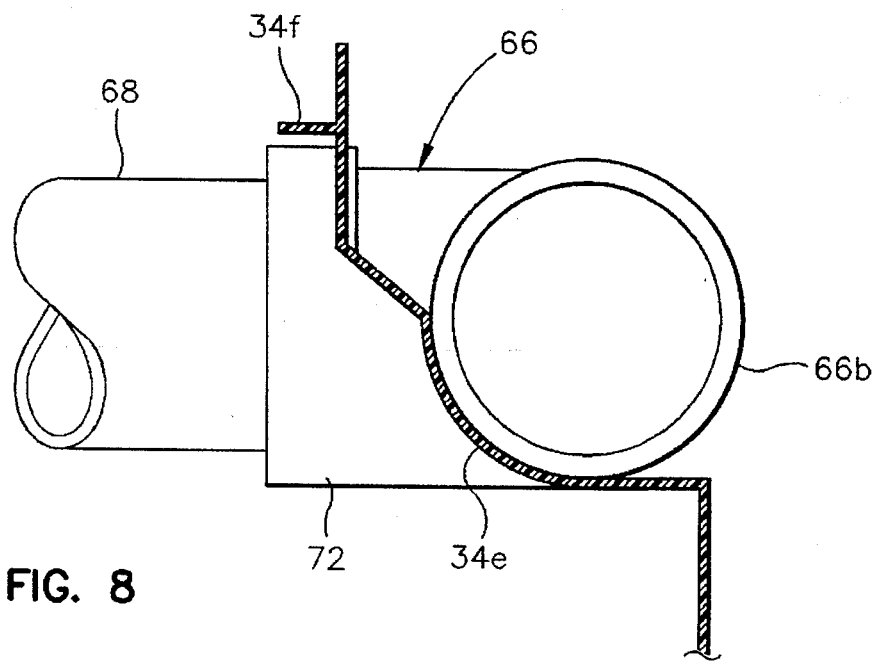
FIG. 8 is a partial vertical sectional view of the preferred embodiment taken along line 8—8 of FIG. 5 showing the installed ninety-degree DWV elbow fitting and a portion of the pipe connected to the upstream end thereof in elevation. These DWV components are also illustrated in the fragmentary perspective view of FIG. 2.

Referring to FIGS. 4, 6 and 8, the upper wall 34e of the box 34 has a portion with a radius of curvature complementary to the outer diameter of the rear end shoulder 66b of the fitting. It will be understood that a T-shaped fitting like that denoted as 26 in FIGS. 1 and 10 could be substituted for the elbow fitting 66 in FIGS. 2 and 8. The upper wall 34e and the cylindrical sleeve 72 provide a drain fitting receptacle.

The rear end of the DWV arm 68 (FIG. 2) is solvent welded inside the upstream end shoulder 66a of the elbow fitting 66. This upstream end shoulder 66a is not visible in FIG. 8 because it is concealed inside the sleeve 72. The end shoulder 66a is visible in FIG. 2. It is solvent welded into the sleeve 72. Conventional DWV parts are made of ABS or PVC plastic. The angle stop box 32 is preferably molded of a plastic that can be solvent welded to ABS or PVC plastic such as polystyrene. It may be molded of fire retardant plastic. The box 32 could also be stamped and/or folded from sheet metal which could be chrome plated or powder coated. In commercial construction, or in fire walls, where plastic wall penetrations are not allowed, a metal trap arm would be attached to the box. For residential construction a plastic sleeve 72 would be inserted into the metal box to allow use with ABS and PVC DWV pipe. The upstream end of the drain extension 70 is solvent welded inside the downstream end shoulder 66b of the elbow fitting The preferred embodiment of our angle stop box is manufactured with a relatively thin sealing disk 74 (FIG. 5) which covers the upstream end of the sleeve 72. The disk 74 seals the drain system connection at this end when the elbow fitting 66 and drain extension 70 are connected thereto and before the arm 68 is connected to the sleeve 72. After pressure testing, the cover 74, which may be a thin layer of plastic, is broken out with a hammer to permit the downstream end of the DWV arm 68 to be solvent welded inside the forward end shoulder 66a of the elbow fitting. This feature eliminates the tedious and troublesome problem of installing a dollar plug, pneumatic seal or other mechanical seal in pressure testing the drain system for the building inspector.

Once our angle stop box 32 has been nailed to a stud, dry wall 76 (FIG. 3) can be installed around the same and the entire assembly will be recessed, prior to connection of the DWV arm 68. It will be understood that lathe and plaster, wood paneling, or other construction materials could be used in place of dry wall 76. The term "wall panel" shall refer to any of these materials. A rectangular escutcheon 78 (FIGS. 3 and 5) fits snugly inside the sidewalls 34a and 34b, bottom wall 34c and top wall edge 34f of the box 34 to provide a finished look. It also seals any existing air gap. The escutcheon has a barbed portion (not illustrated) to allow it to snap snugly in place over a range of wall thicknesses. The escutcheon provides a mechanical interconnection between the box 34 and the drywall 76 to further anchor the assembly in place.

Figure 10:
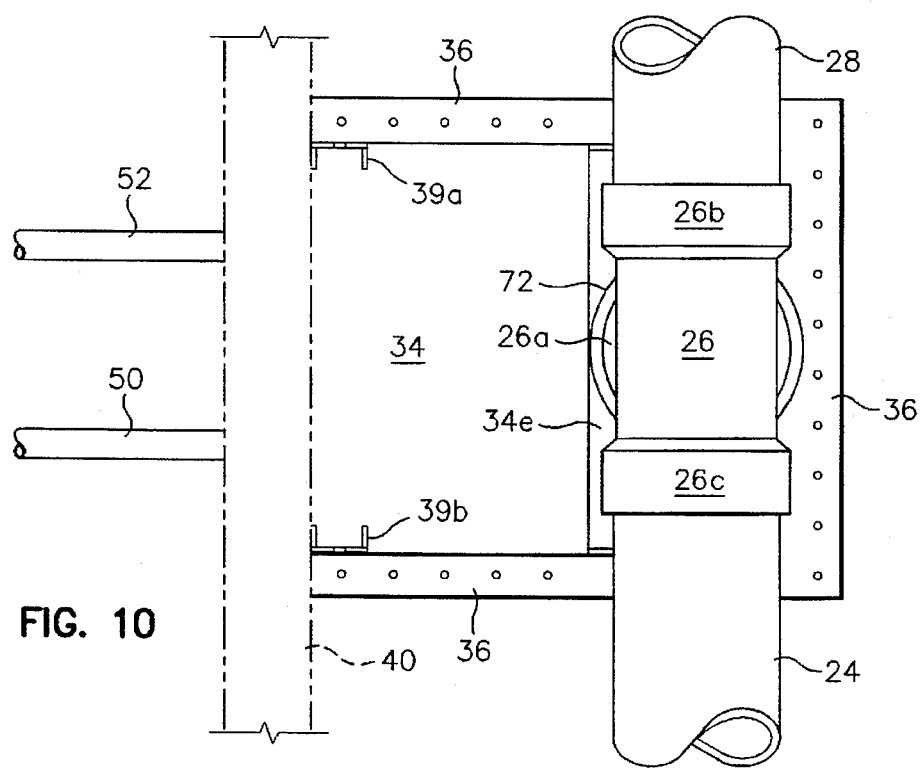
FIG. 10 is a rear elevation view of our angle stop box installed sideways. A T-shaped fitting is connected to the angle stop box. Drain and vent pipes are connected to the T-shaped fitting.
Figure 11:
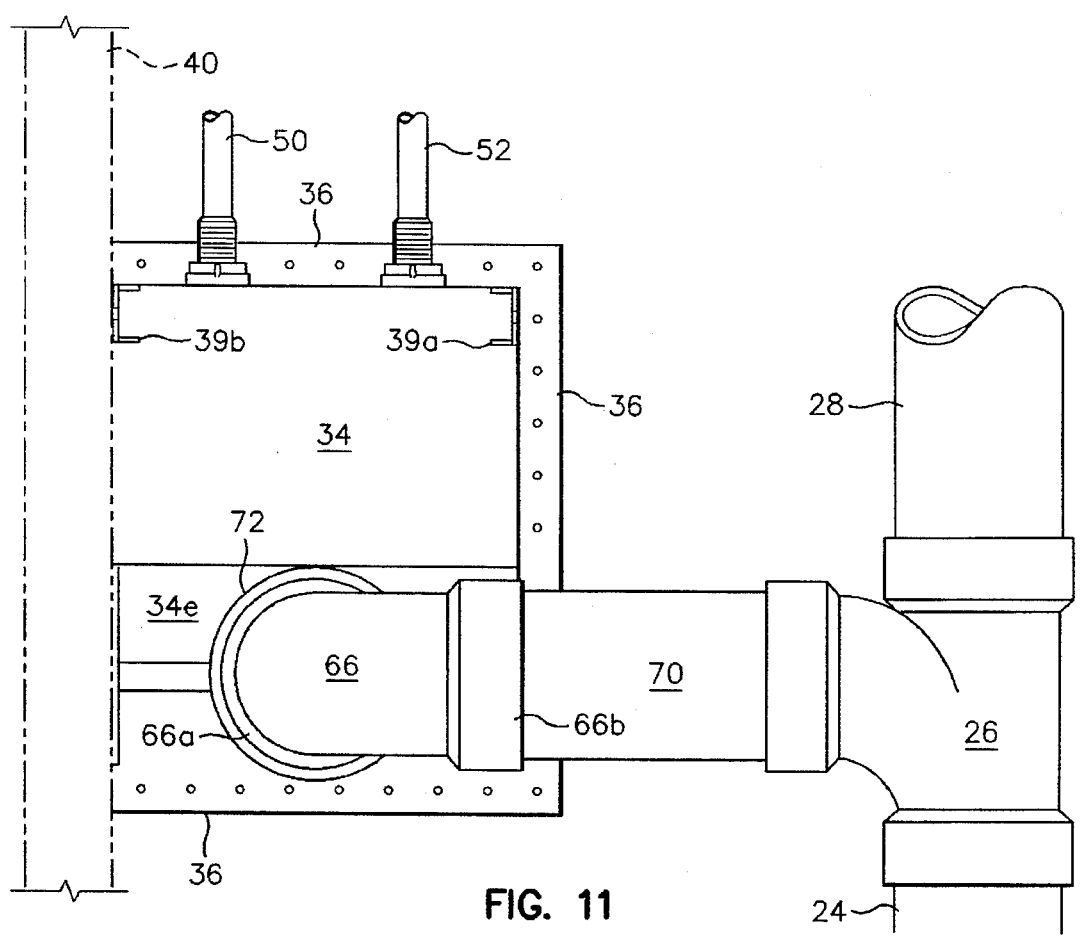
FIG. 11 is a rear elevation view of our angle stop box installed to permit hot and cold water supply lines to be connected thereto from above. An elbow fitting is connected to the angle stop box. A T-shaped fitting connects a drain extension from the elbow fitting to drain and vent pipes.

Our angle stop box can be installed in different orientations as illustrated in FIGS. 10 and 11. In FIG. 10 the flange 36 of the box 34 is nailed to the vertical stud 40 so that horizontally extending hot and cold water supply lines 50 and 52 can be connected to the angle stop valves (not visible). One enlarged shoulder 26a of the T-shaped fitting 26 is glued into the sleeve 72. The other two enlarged end shoulders 26b and 26c of the T-shaped fitting 26 mate with the curved portion of the upper wall 34e of the box 34. The drain pipe 24 is glued into the lower end 26c of the fitting 26 and the vent pipe 28 is glued into the upper end 26b of the fitting 26. In FIG. 11 the flange 36 of the box 34 is nailed to the vertical stud 40 so that hot and cold water supply lines 50 and 52 which extend downwardly from above can be connected to the angle stop valves (not visible). One end of the elbow fitting 66 is glued into the sleeve 72. The other end of the elbow fitting 66 is glued to a first end of the drain extension 70. The second end of the drain extension 70 is glued to one end of the T-shaped fitting 26. The drain pipe 24 and vent pipe 28 are glued to the respective lower and upper ends of the T-shaped fitting 26.

While we have described a preferred embodiment of our angle stop box with a drain fitting receptacle, it will be apparent to those skilled in the art that our invention may be modified in both arrangement and detail. Therefore, the protection afforded our invention should only be limited in accordance with the scope of the following claims:

We claim:

1. In a plumbing installation including a wall having vertical studs covered with a wall panel, a lavatory mounted adjacent the wall panel having hot and cold faucets with corresponding lavatory supply lines connected thereto, and hot and cold water supply lines extending between the studs behind the wall panel, the improvement comprising:

a housing mounted in a cut out region in the wall panel and secured to at least one of the vertical studs;

a pair of angle stop valves mounted to the housing and connected to corresponding ones of the hot and cold water supply lines and lavatory supply lines for directing hot water to the hot faucet and cold water to the cold faucet;

a P-trap having a vertical segment connected to the lavatory and an arm extending substantially horizontally through the wall panel; and a drain pipe connected to the arm of the P-trap.

2. The invention of claim 1 wherein the arm of the P-trap extends through the housing.

3. The invention of claim 1 wherein the housing comprises a hollow box.

4. The invention of claim 1 wherein the housing comprises a hollow box having a bottom wall with a pair of holes for receiving the shanks of the angle stop valves.

5. The invention of claim 1 wherein the housing comprises a hollow box having a drain fitting receptacle formed therein for receiving the arm of the P-trap.

6. The invention of claim 1 wherein the housing comprises a hollow rectangular box having a bottom wall with a pair of holes for receiving the shanks of the angle stop valves and having a rear wall with a drain fitting receptacle formed therein for receiving the arm of the P-trap.

7. The invention of claim 1 wherein the drain fitting receptacle includes a cylindrical sleeve for receiving the arm of the P-trap.

* * * * *